(12) United States Patent
Yu et al.

(10) Patent No.: US 6,554,459 B2
(45) Date of Patent: Apr. 29, 2003

(54) SUPPORT BRACKET FOR LIGHT STAND

(75) Inventors: Chi Yu, Brooklyn, NY (US); Dale Marks, Houston, TX (US)

(73) Assignee: Lowel-Light Manufacturing, Inc., Brooklyn, NY (US)

( * ) Notice: Subject to any disclaimer, the term of this patent is extended or adjusted under 35 U.S.C. 154(b) by 0 days.

(21) Appl. No.: 09/821,307

(22) Filed: Mar. 28, 2001

(65) Prior Publication Data

US 2002/0141198 A1 Oct. 3, 2002

(51) Int. Cl.[7] .................................................. F21S 8/08
(52) U.S. Cl. .................... 362/418; 362/401; 362/410
(58) Field of Search ................................. 362/418, 419, 362/431, 433, 401, 410, 414

(56) References Cited

U.S. PATENT DOCUMENTS 2,440,873 A * 5/1948 Popp et al. ............... 248/284.1
5,088,014 A * 2/1992 Boughey .................... 362/132

* cited by examiner

Primary Examiner—Stephen Husar
Assistant Examiner—John Anthony Ward
(74) Attorney, Agent, or Firm—Notaro & Michalos P.C.

(57) ABSTRACT

A support bracket for a device, such as a light, has a swivel mount provided at one end of a bent support arm, the other end of which can be held in a conventional stand. The support arm is shaped to position a light or other device connected to the swivel mount so that the center of gravity of the light is over the vertical axis of the stand. Positioning the center of gravity over the vertical axis of the stand is essential, so that the need for counterweights, counterbalances and ballasts is reduced in order to keep the light stable when mounted on the connector bracket held by a stand. When the center of gravity of the light is also aligned with a horizontal axis of the swivel mount bracket, the light can be pivoted and rotated on the bracket without affecting the balance. The tilt bracket is preferably used with portable lights so that the amount and weight of equipment needed to mount the light is reduced.

39 Claims, 4 Drawing Sheets

SUPPORT BRACKET FOR LIGHT STAND

FIELD AND BACKGROUND OF THE INVENTION

The present invention relates generally to the field of professional lighting and in particular to a new and useful support bracket for holding lights and other devices on a stand. The invention is particularly useful for holding portable lights.

Conventionally, light stands are tripod supports having a vertical post for connecting a light fixture at the upper end. Usually, the light fixture weighs more than the support stand, causing the stand to be top heavy when the light fixture is attached. In such cases, the weight of the light fixture is either counterbalanced using a horizontal arm connected at the upper end of the post, or ballast weights can be placed over the tripod legs at the lower end of the support.

It is generally known to support small lights from cantilevered arms. Patents which disclose supporting a light fixture from a bent support arm over a base include U.S. Pat. No. 4,736,278. The support arm is connected to one side of a base and extends vertically before bending horizontally over the base and then vertically again, to provide a cantilever support for a light bulb fixture. The light bulb fixture does not rotate or pivot on the end of the support arm.

Other light stands and lights use a counterbalance against the weight of the light to hold it in place, such as taught by U.S. Pat. No. 3,077,537. U.S. Pat. No. 3,077,537 discloses a light support having a ball pivot held at the end of a horizontally extending arm of a tripod stand. The upper portion of the support above the ball pivot is bent to one side gradually, and then back horizontally. A light is held below the horizontal section at the upper end of the support. The lower end of the light support has a counterweight, so that the support arm may be pivoted to swing the light to positions other than vertical and remain there until moved again. The light initially has its center of gravity over the counterweight, but once the light is moved off-center, this is no longer the case.

Articulated arm supports are known as well, such as shown in U.S. Pat. No. 4,525,773 for a light fixture supported on a series of single rods connected with holders. The ends of the rods are bent 90° at their ends to fit into receptacles in the holders The rods and holders conduct electricity for the light fixture. One rod extends vertically from a base to prevent the light from tipping over. The rods and holders form an articulated arm that can be used to position the light in various positions, depending on how many rods are used.

U.S. Pat. No. 4,536,828 teaches one embodiment of a light which has a flexible arm for positioning a reflector over a light source. The reflector is held at one end of the arm, while the other is shown secured to the upper end of a tripod stand.

Supports having a lower horizontal base, a vertical post and a horizontally extending light fixture connected to the upper end of the post, are known such as the one disclosed in U.S. Pat. No. 4,562,520. The light fixture extends over the lower horizontal base, so that the weight of the light is borne by the base. The shade over the light fixture can rotate around the bulb 360°.

U.S. Pat. No. 5,060,118 teaches a light fixture for providing daylight color effects supported on a horizontal arm over a U-shaped base. The light fixture is supported on the horizontal arm by a pivot connection which only permits the light fixture to be rotated up and down about the horizontal axis of the fixture.

U.S. Pat. No. 4,624,259 shows a tanning bed light array which is held on the end of a horizontal arm over a T-shaped base. The light array is not centered on the horizontal arm. The light array can rotate around the horizontal arm almost 360°, but one end of the light array will contact the T-shaped base when the array is vertical.

U.S. Pat. No. 3,738,405 displays a stand, particularly for use in holding medical and surgical equipment having a U-shaped base oriented horizontally on the ground with a vertical post rising upwardly from the center of the bottom of the U. A tray extends horizontally from the top of the post over the U-shaped base, so that the weight of the tray is balanced over the base. The tray does not pivot or rotate, but the stand is provided with wheels on the base so that the entire stand can be moved easily.

Patents teaching support arms which are bent to go around a light source for holding a shade over the light source include U.S. Pat. No. 4,562,521. A stand for a light bulb has a support rod connected to a lower portion of the stand adjacent the light bulb which bends horizontally over the top of the light bulb, and then bends vertically again. The upper vertical section of the rod is positioned over the center of the light bulb and is used to support a shade around the light bulb.

A portable luminescent light held immediately adjacent the vertical support of a tripod stand is disclosed in U.S. Pat. No. 5,890,793. A screw mounted bracket is used to secure the vertical support of the tripod stand between the bracket and the rear side of a case holding the portable luminescent light fixture. Thus, the case and light fixture are not positioned with their center of gravity over the support.

While prior stands have addressed many problems, they do not cover the problem of supporting a relatively large or heavy device on a tripod or other type of stand without using ballasts, counterweights or other additional stabilizing equipment. In particular, lighting devices, such as lights and reflectors, and other electronic equipment like speakers, microphones and even cameras are all difficult to support with stable stand like a tripod stand without using ballasts and counterweights.

New, portable lighting equipment is becoming more popular as different lights which collapse or fit into cases become available. A key feature of portable lighting equipment is that a light, such as for professional photography, television news crews and documentary film production, can be folded or broken down into a compact, self contained case for transport. Other lights of this type may be fit into cases for carrying. These lights are easily assembled for use. However, they are still relatively heavy compared to the tripod or other types of stands which are used to support them. For example one kind of light of this type sold by Lowel-light Manufacturing weighs approximately between 9–15 pounds when assembled for use. A tripod stand can weigh as little as 2–3 pounds by comparison.

Thus, when a heavy and/or large light is mounted on top of a light support stand which weighs considerably less, or is smaller in width, ballasts or counterweights must be used to prevent the mounted light from tipping over, especially if it will be adjusted on the stand. The need to carry additional weights with a portable system is very disadvantageous to the idea of portable professional lighting. Even in a static environment, counterweights and ballasts add size to support stands, thereby limiting their ability to be disguised or placed unobtrusively.

SUMMARY OF THE INVENTION

It is an object of the present invention to provide a stand support for rotatably mounting a device on a stand which reduces the need for additional ballasts or counterweights to balance the assembled light and stand. The device may be a light, speaker, microphone, reflector or other equipment.

Another object of the invention is to provide a stand support for positioning a device so that a center of gravity of the device is located over the main support shaft of the stand.

Accordingly, a support bracket for a device has a swivel mount provided at one end of a bent support arm, the other end of which can be connected to any known type of stand. The support arm is shaped to position the device connected to the swivel mount so that the center of gravity of the device, such as a light, is over the vertical axis of the stand. Positioning the center of gravity over the vertical axis of the stand is essential, so that the need for counterweights, counterbalances and ballasts to keep the light or other device stable when mounted is significantly reduced. When the center of gravity of the light is also aligned with a horizontal axis of the swivel mount bracket, the light can be pivoted and rotated on the bracket without affecting the balance. The tilt bracket is preferably used with portable lights so that the amount and weight of equipment needed to mount the light is reduced.

In one embodiment of the support, the device is a light, speaker, reflector or microphone.

In another embodiment of the support, the support arm has adjustable bends between the arm sections, so that many different angles can be formed, permitting rapid adjustment of different devices.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
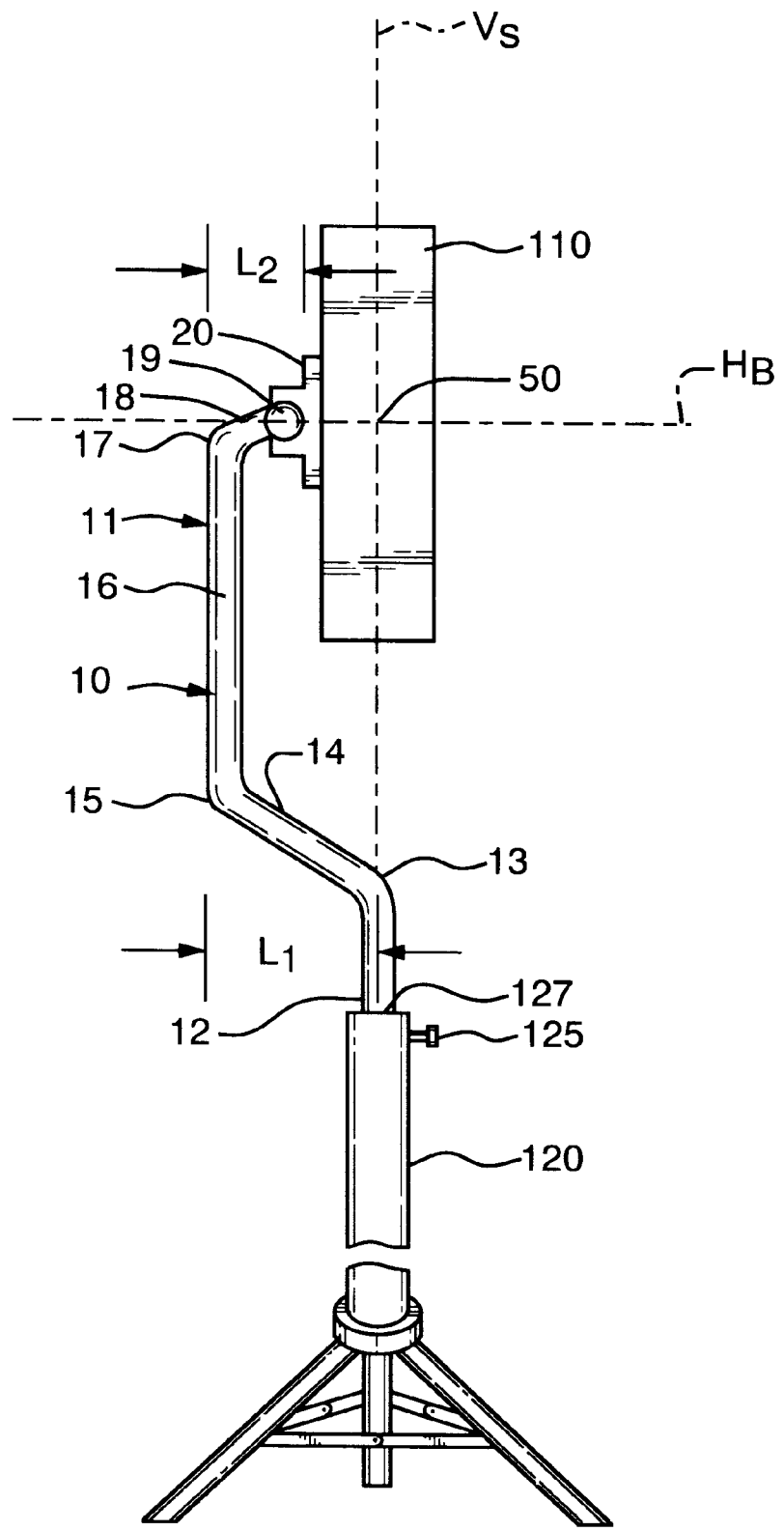
FIG. 1 is a side elevational view of a light mounted on a tripod stand using a bracket according to the invention.
Figure 2:
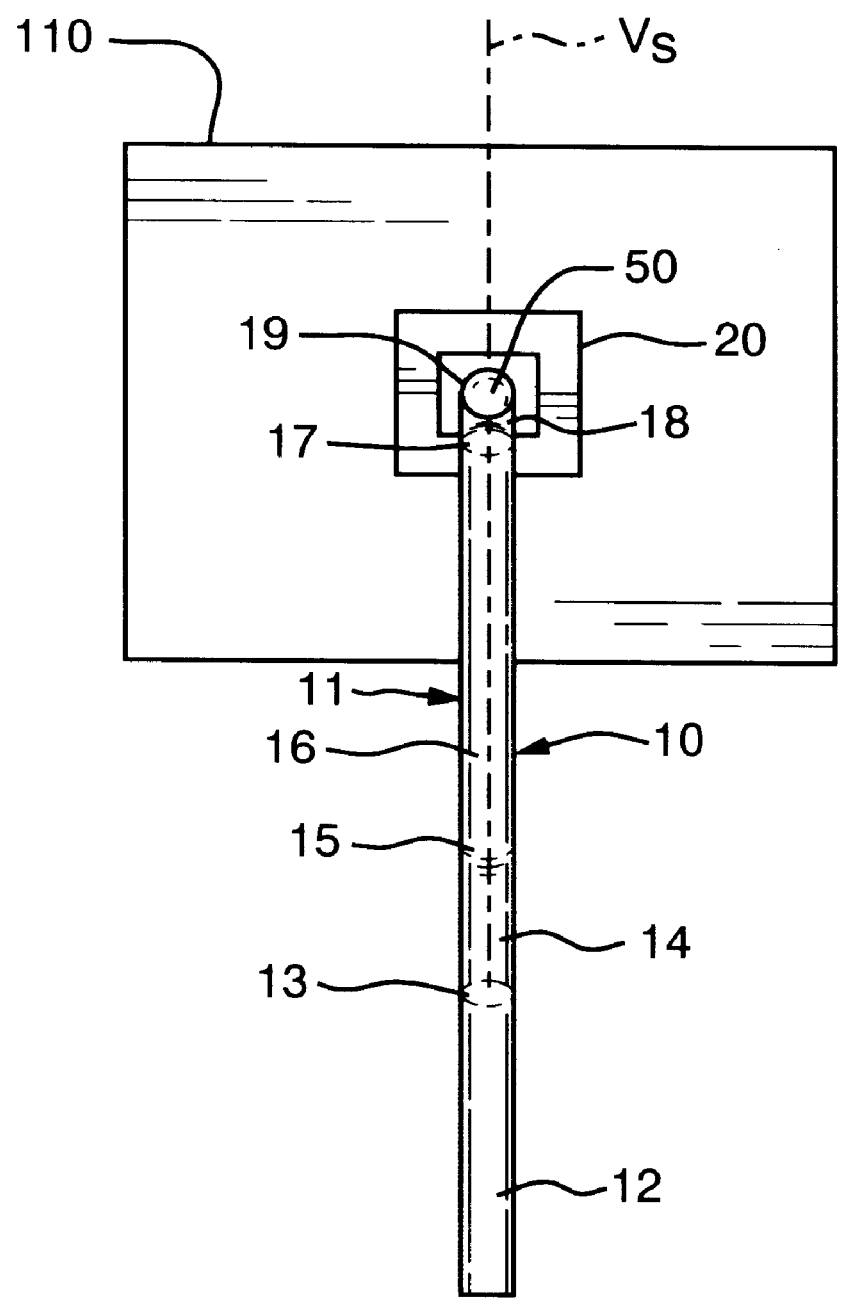
FIG. 2 is a rear elevational view of the light and bracket of FIG. 1.

Referring now to the drawings, in which like reference numerals are used to refer to the same or similar elements, FIGS. 1 show a support bracket 10 having a support arm 11 formed as a bent rod and a swivel connector 19 at the upper end 18 of the support arm 11. The bracket 10 has a lower end 12 of the bent rod support arm 11 secured in the post receptacle 127 of a stand 120 by a thumb screw 125 or other threaded fastener.

While a tripod stand 120 is shown in the drawings, it is intended that the bracket 10 of the invention can be used with all types of stands, including four-legged and pedestal based stands. Further, it is intended that the bracket 10 can be secured to a stand using a variety of means, including clamps, offset clamps, different male/female connectors and other connectors which securely hold the bracket 10 in place on the stand. It should be noted as well that the connection between the bracket 10 and stand does not have to be the top of the stand, but may be horizontally offset, provided that the center of gravity of the device held by the bracket is positioned over the vertical axis of the stand, as described more completely below.

The support arm 11 has three bends 13, 15, 17, between upper end 18 and lower end 12. The lower end 12 of the bent rod support arm 11 is vertical. At the first bend 13 adjacent to the lower end 12, the arm 11 bends at an angle of between 0° and 180°, with a practical range being between 10° and 170°. The angle is preferably between 20° and 160°, and more preferably between 45° and 135°. As used herein, the angles at the bends 13, 15, 17 are defined as the inside angles between adjacent segments 12, 14, 16, 18 of the arm 11.

The first bend 13 is made so that a lower cantilever section 14 extends having a horizontal component for a horizontal distance $L_1$. The second bend 15 preferably has a second angle which is the same as a first angle of the first bend 13, but in the opposite direction. That is, the first and second angles are preferably corresponding angles.

Second bend 15 is made at the far end of lower cantilever section 14. As noted above, the second bend 15 is the in the opposite direction from first bend 13, and at a second angle which makes middle arm section 16 between the second and third bends 15, 17 extend substantially vertical from second bend 15.

The arm 11 makes the third bend 17 at a third angle between 0° and 180°, with a practical range being between 10° and 170°. The angle is preferably between 20° and 160° and more preferably between 45° and 135°. Third bend 17 is made to have the third angle so that the upper end 18 extends having a horizontal component. Upper end 18 is aligned over the lower cantilever section 14 between the first and second bends 13, 15. The upper end 18 extends a shorter horizontal distance $L_2$ than the horizontal distance $L_1$.

The upper end 18 of the bracket 10 has the swivel connector 19 for removably or permanently securing to a corresponding connector 20 on a light 110, such as a CASELITE light, made by Lowel-light Manufacturing, Inc. of Brooklyn, N.Y. It should be noted that the light 110 could be another device which is advantageously mounted to a support stand. Other such devices include speakers, light reflectors, microphones, cameras and the like.

The swivel connectors 19, 20, for example, can be a ball and socket type connector. The swivel connectors 19, 20 permit the light 110 to be rotated 360° about a horizontal axis $H_B$ of the swivel connectors 19, 20 in the vertical plane. The swivel connectors 19, 20 may also allow some pivotal movement to the left and right about a vertical axis $V_S$ of the stand 120. The swivel connectors 19, 20 preferably should allow a minimum of one degree of freedom of movement, although connectors 19, 20 permitting none, two or three degrees of freedom of movement may be used.

The light 110 is mounted so that the center of gravity 50 of the light 110 is positioned over the vertical axis $V_S$ of the tripod stand 120. In a most preferred embodiment, the center of gravity 50 is also aligned with the horizontal axis $H_B$. In such case, when the light 110 is rotated, the center of gravity 50 remains on the vertical axis $V_S$.

The length of the middle arm section 16 (distance between the second and third bends) is made sufficiently long so that a CASELITE light or other device being mounted can rotate a full 360° while mounted on the support bracket 10, as discussed above. The length of the middle arm section 16 is preferably between 15–20 inches long, depending on the angles of first, second and third bends 13, 15, 17, for a CASELITE light.

The lengths $L_1$ of the lower cantilever section 14 and $L_2$ of the upper section 18 are selected so that the center of gravity 50 of the light 110 connected to the swivel bracket 19 will be positioned over the lower end 12 and aligned on the vertical axis $V_S$ when the swivel connector 19 is secured to the corresponding connector 20 on the light 110. The length $L_1$ of lower cantilever section 14 is about 6 inches long for a CASELITE light, while the length $L_2$ of the upper section is about 4 inches.

Figure 3:
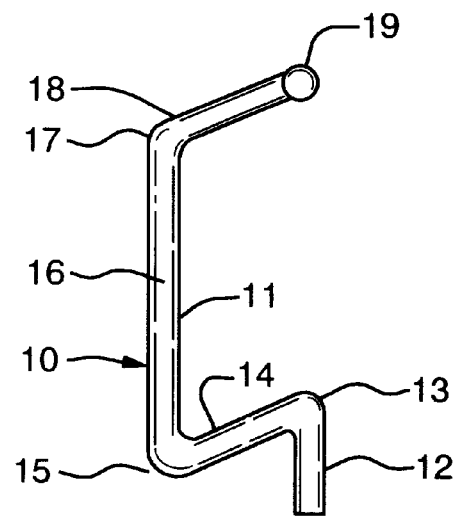
FIG. 3 is a side elevational view of an alternative embodiment of the bracket in accordance with the invention.
Figure 4:
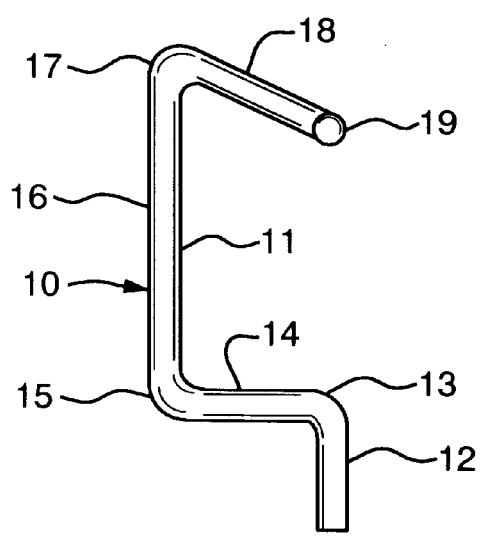
FIG. 4 is a side elevational view of a second alternative embodiment of the bracket in accordance with the invention.

FIGS. 3 and 4 illustrate alternative embodiments of the support bracket 10 having different first, second and third angles formed at each of the first, second and third bends 13, 15, 17, respectively. Further the support arm 11 of support bracket 10 may be formed using a cylindrical rod, a flat bar, or a rod having a square or other polygon cross-section, as opposed to a cylindrical rod. The brackets 10 of FIGS. 3 and 4 illustrate the use of a flat bar.

In FIG. 3, the first and second bends 13, 15 are arranged so that lower cantilever section 14 extends downwardly as well as horizontally from lower end 12. FIG. 4 illustrates the bracket 10 when third bend 17 has an angle greater than 90°, so that upper section 18 is oriented having a downward component as well as a horizontal one. The various angles formed in each of the illustrated brackets 10 may be used in many different combinations, provided that the device 110 which is supported on the bracket is arranged with the center of gravity over the lower end 12.

Figure 5:
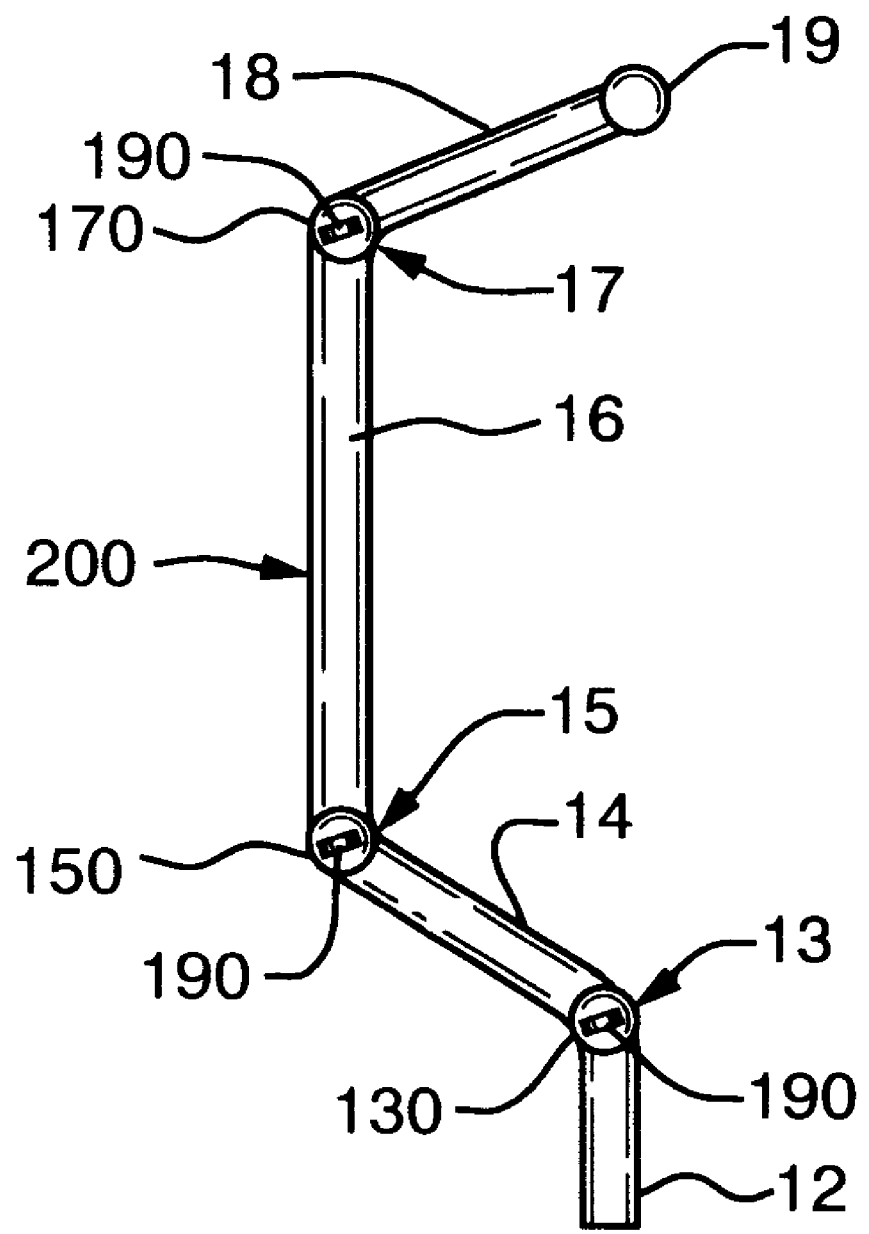
FIG. 5 is a side elevational view of a third alternative embodiment of the bracket.

In a further embodiment of the support bracket 200 shown in FIG. 5, the first, second and third bends 13, 15, 17 are made adjustable by known means, such as a threaded tightening mechanism for securing a pivoting joint. Each bend 13, 15, 17 is formed as a pivoting joint 130, 150, 170, respectively, connecting the respective sections 12, 14, 16, 18 together. The pivoting joints 130, 150, 170 permit the first, second and third angles formed between each pair of adjacent sections 12, 14, 16, 18 to be adjusted to essentially any desired angle between 0° and 180°, although for practical purposes the angle should be between 10° and 170°, preferably between 20° and 160° and more preferably between 45° and 135°. A manual fastening mechanism 190 is provided on each pivoting joint 130, 150, 170 for securing the joint at a fixed angle for use.

The adjustable nature of the bracket 200 permits a wide range of devices 110 to be mounted on a stand having their centers of gravity positioned over the lower end 12.

It should be noted that while the arm 11 of bracket 10 is described as having three bends, with the upper section 18 connected to a bracket, the upper section 18 may be incorporated with bracket connectors 19, 20 which secure the light 110 to the arm 11 in place of third bend 17. Thus, the light 110 is still positioned with the center of gravity 50 over the vertical axis $V_S$ of the stand 120.

While a specific embodiment of the invention has been shown and described in detail to illustrate the application of the principles of the invention, it will be understood that the invention may be embodied otherwise without departing from such principles.

What is claimed is:
1. A support comprising:
  a stand having a vertical axis;
  a support arm comprising:
    a lower vertical section for securing one end to the stand;
    a lower cantilever section forming a first bend having a first angle with the lower vertical section and extending a first horizontal distance;
    a middle arm section forming a second bend having a second angle with the lower cantilever section and the middle arm section extending upwardly;
    an upper end forming a third bend having a third angle with the middle arm section, the upper end extending a second horizontal distance, the upper end aligned over the lower cantilever section; and
  means at the upper end of the support arm for connecting the support arm to a device being supported, wherein a center of gravity of the device is positioned on the vertical axis when the device is connected to the support arm.

2. A support according to claim 1, wherein the means comprises a swivel connector at the upper end of the support arm for connecting to a corresponding connector on the device.

3. A support according to claim 1, wherein the first, second and third angles are each between 20–160°.

4. A support according to claim 1, wherein the first horizontal distance is greater than the second horizontal distance.

5. A support according to claim 1, wherein the device is one of a light, a light reflector, a microphone, a camera and a speaker.

6. A support according to claim 5, wherein each of the first, second, and third angles is adjustable.

7. A support according to claim 1, wherein each of the first, second, and third angles is adjustable.

8. A lighting kit comprising:
  a light having a center of gravity;
  a stand having a vertical axis; and
  means for mounting the light to the stand with the center of gravity of the light positioned on the vertical axis of the stand.

9. A kit according to claim 8, further comprising a bracket connector on the light, the bracket connector having a horizontal axis, the center of gravity of the light remaining on the vertical axis when the light is rotated about the horizontal axis.

10. A kit according to claim 9, wherein the means comprises a support arm having a lower vertical section for securing one end to the stand, a lower cantilever section forming a first bend having a first angle with the lower vertical section and extending a first horizontal distance, a middle arm section forming a second bend having a second angle with the lower cantilever section and the middle arm section extending upwardly, an upper end forming a third bend having a third angle with the middle arm section, the upper end extending a second horizontal distance, the upper end aligned over the lower cantilever section, and bracket means for connecting the support arm to the bracket connector.

11. A kit according to claim 10, wherein each of the first, second and third angles is between 20–160°.

12. A kit according to claim 11, wherein the first horizontal distance is greater than the second horizontal distance.

13. A kit according to claim 8, wherein the means comprises a support arm having a lower vertical section for securing one end to the stand, a lower cantilever section forming a first bend having a first angle with the lower vertical section and extending a first horizontal distance, a middle arm section forming a second bend having a second angle with the lower cantilever section and the middle arm section extending upwardly, an upper end forming a third bend having a third angle with the middle arm section, the upper end extending a second horizontal distance, the upper end aligned over the lower cantilever section, and bracket means for connecting the support arm to the light.

14. A kit according to claim 13, wherein each of the first, second and third angles is between 20–160°.

15. A kit according to claim 14, wherein each of the first, second and third angles is between 30–150°.

16. A kit according to claim 13, wherein the light is portable.

17. A kit according to claim 16, wherein the first, second and third angles are each adjustable.

18. A kit according to claim 17, wherein the first horizontal distance is greater than the second horizontal distance.

19. A kit according to claim 13, wherein the first horizontal distance is greater than the second horizontal distance.

20. A kit according to claim 13, wherein the first, second and third angles are each adjustable.

21. A kit according to claim 13, wherein the bracket means comprises a swivel connector at the upper end of the support arm for connecting to a corresponding connector on the light.

22. A lighting kit comprising:
a light having a center of gravity;
a stand having a vertical axis;
an arm having at least two bends;
first means for mounting the arm to the stand; and
second means for mounting the light to the arm so that the center of gravity of the light is positioned over the vertical axis of the stand.

23. A lighting kit according to claim 22, wherein the arm comprises a lower vertical section for securing one end to the stand; a lower cantilever section forming a first bend having a first angle with the lower vertical section and extending a first horizontal distance; and, a middle arm section forming a second bend having a second angle with the lower cantilever section and the middle arm section extending upwardly.

24. A lighting kit according to claim 23, wherein the second means comprises an upper end forming a third bend having a third angle with the middle arm section and bracket means for connecting the upper end to the light, the upper end and bracket means aligned over the lower cantilever section.

25. A kit according to claim 24, wherein each of the first, second and third angles is between 20–160°.

26. A kit according to claim 24, wherein each of the first, second and third angles is between 30–150°.

27. A kit according to claim 24, wherein the first, second and third angles are each adjustable.

28. A kit according to claim 22, wherein the light is portable.

29. A kit according to claim 22, wherein the second means forms a third bend defining a third angle between the arm and the light, the at least two bends defining first and second angles respectively.

30. A kit according to claim 29, wherein each of the first, second and third angles is between 20–160°.

31. A kit according to claim 29, wherein each of the first, second and third angles is between 30–150°.

32. A kit according to claim 29, wherein the first, second and third angles are each adjustable.

33. A support bracket for holding a device on a stand with a center of gravity of the connected device positioned over a vertical axis of the stand, the support bracket comprising:
a support arm comprising:
a lower vertical section for securing to the stand and extending along the vertical axis;
a lower cantilever section forming a first bend having a first angle with the lower vertical section and extending a first horizontal distance;
a middle arm section forming a second bend having a second angle with the lower cantilever section and the middle arm section extending upwardly;
an upper end forming a third bend having a third angle with the middle arm section, the upper end extending a second horizontal distance, the upper end aligned over the lower cantilever section; and
means at the upper end of the support arm for connecting the support arm to the device so that the device center of gravity is aligned over the vertical axis.

34. A support bracket according to claim 33, wherein the first, second and third angles are each between 20–160°.

35. A support bracket according to claim 34, wherein the first horizontal distance is greater than the second horizontal distance.

36. A support bracket according to claim 33, wherein the first and second angles are corresponding angles.

37. A support bracket according to claim 36, wherein the first horizontal distance is greater than the second horizontal distance.

38. A support bracket according to claim 33, wherein the means comprises a swivel connector at the upper end of the arm for connecting to a corresponding connector on the light.

39. A support bracket according to claim 33, wherein each of the first, second and third angles is adjustable.

* * * * *